United States Patent
Na et al.

(10) Patent No.: US 11,459,240 B2
(45) Date of Patent: Oct. 4, 2022

(54) METHOD OF MANUFACTURING GRAPHENE AND APPARATUS THEREFOR

(71) Applicant: LMS CO., LTD, Pyeongtaek-si (KR)

(72) Inventors: Ho Seong Na, Anyang-si (KR); Joo Young Kim, Osan-si (KR); Min Soo Lee, Anyang-si (KR); Yong Won Choi, Suwon-si (KR)

(73) Assignee: LMS CO., LTD, Pyeongtaek-si (KR)

( * ) Notice: Subject to any disclaimer, the term of this patent is extended or adjusted under 35 U.S.C. 154(b) by 542 days.

(21) Appl. No.: 16/540,597

(22) Filed: Aug. 14, 2019

(65) Prior Publication Data
US 2020/0131041 A1 Apr. 30, 2020

(30) Foreign Application Priority Data
Oct. 29, 2018 (KR) .................. 10-2018-0129635

(51) Int. Cl.
- *C01B 32/192* (2017.01)
- *C01B 32/225* (2017.01)
- *B01J 19/10* (2006.01)
- *C01B 32/23* (2017.01)

(52) U.S. Cl.
CPC ............ *C01B 32/192* (2017.08); *B01J 19/10* (2013.01); *C01B 32/225* (2017.08); *C01B 32/23* (2017.08); *B01J 2219/089* (2013.01)

(58) Field of Classification Search
CPC ..... C01B 32/192; C01B 32/225; C01B 32/23; C01B 32/19; C01B 32/184; C01B 32/182; C01B 32/22; C01B 2204/20; B01J 19/10; B01J 2219/089; H01G 11/62; H01G 11/60; H01G 11/32; H01G 11/36; H01G 11/46; H01G 11/24; C25B 1/135; C25B 11/04; C25B 1/00
See application file for complete search history.

(56) References Cited

U.S. PATENT DOCUMENTS

| | | | |
|---|---|---|---|
| 2012/0107593 A1* | 5/2012 | Luo | C01B 32/23 |
| | | | 977/734 |
| 2017/0050854 A1* | 2/2017 | Czajka | C01B 32/19 |
| 2021/0108317 A1* | 4/2021 | Ejigu | C01B 32/19 |

FOREIGN PATENT DOCUMENTS

| | | |
|---|---|---|
| CN | 106744881 A | 5/2017 |
| KR | 2013-0083128 A | 7/2013 |
| KR | 10-2016-0114372 A | 10/2016 |
| KR | 10-2017-0126292 A | 11/2017 |

OTHER PUBLICATIONS

Korean Office Action dated Mar. 10, 2020, in connection with corresponding Korean Patent Application No. 10-2018-0129635.

\* cited by examiner

*Primary Examiner* — Xiuyu Tai
(74) *Attorney, Agent, or Firm* — Hauptman Ham, LLP

(57) ABSTRACT

Disclosed are a method of manufacturing graphene and an apparatus therefor. The method of manufacturing graphene and the apparatus therefor according to the present disclosure allow production of high-quality graphene in a simple manner in a short time without addition of a separate additive.

14 Claims, 1 Drawing Sheet

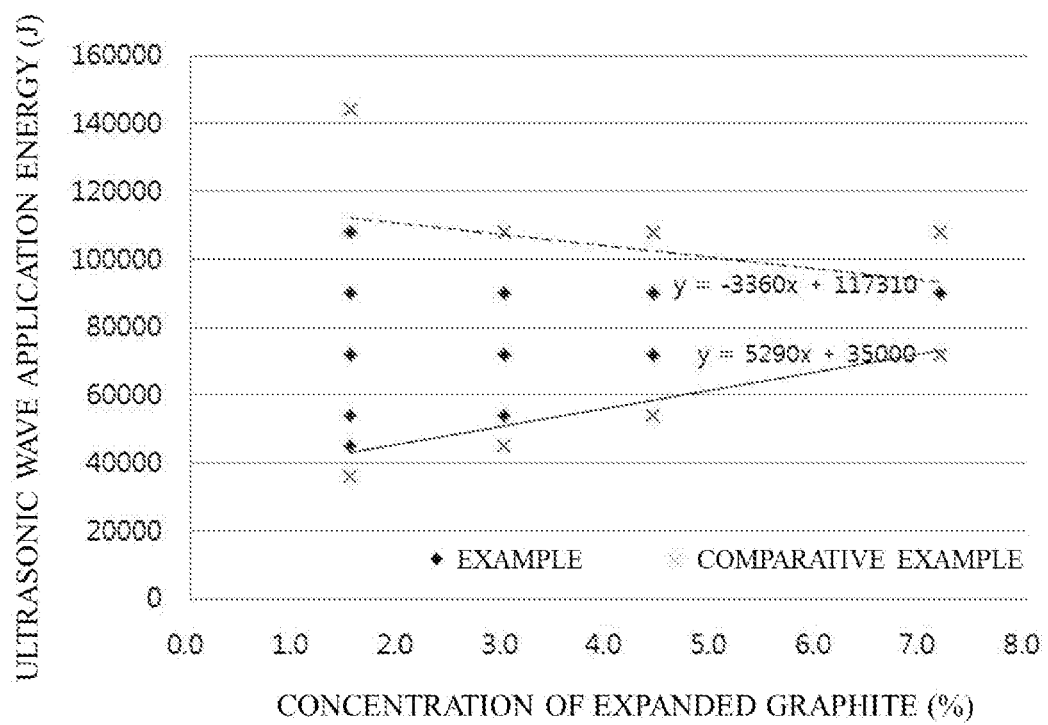

METHOD OF MANUFACTURING GRAPHENE AND APPARATUS THEREFOR

CROSS-REFERENCE TO RELATED APPLICATION

This application claims priority to and the benefit of Korean Patent Application No. 10-2018-0129635, filed on Oct. 29, 2018, the disclosure of which is incorporated herein by reference in its entirety.

BACKGROUND

1. Field of the Invention

The present disclosure relates to a method of manufacturing graphene and an apparatus therefor.

2. Discussion of Related Art

Graphene, which is one of the carbon allotropes, has a structure wherein carbon atoms assemble to form a two-dimensional plane. Such graphene has advantages in various aspects such as excellent mechanical characteristics, high thermal conductivity, and a reduced material consumption amount.

Due to these advantages, graphene is being used in various fields such as touch panels, flexible displays, high-efficiency solar cells, heat dissipation films, coating materials, ultra-thin speakers, seawater desalination filters, electrodes for secondary batteries, and high-speed chargers.

As a general method of manufacturing graphene, a method of exfoliating graphite is used. As efficient methods of manufacturing graphene, there are a physical graphite exfoliation method and a chemical graphite exfoliation method.

The physical graphite exfoliation method is characterized by applying mechanical force to graphite crystals consisting of several layers to exfoliate the graphite crystals one layer at a time. That is, graphene is generated by one layer from graphite crystals using physical force. However, in the case of the physical graphite exfoliation method, it is impossible to manufacture graphene having a large area, a defect rate is high, and it is impossible to mass-produce graphene.

The chemical graphite exfoliation method, which utilizes the oxidation-reduction characteristics of graphite, is characterized by oxidizing graphite with a strong acid, an oxidizer, etc. to produce graphite oxide (GO). Since graphite oxide is hydrophilic, water molecules are easily intercalated between graphite oxide planes. Accordingly, when graphite oxide is brought into contact with water, water molecules permeate between planes of the graphite oxide due to strong hydrophilicity of the graphite oxide. As a result, intervals between graphite oxide planes increase, whereby graphite can be easily exfoliated by long-time stirring or by means of an ultrasonic pulverizer. As particular examples thereof, there are solution reflux, aqueous carbodiimide pulverization, and hydrazine pulverization.

Commonly, fine graphite crystals are fed into a mixture of strong sulfuric acid and nitric acid so that carbonyl compound particles are attached to edges of graphene sheets. The carbonyl compound is converted into acid chloride (acyl chloride) by adding thionyl chloride, and then octadecylamine (ODA) is added thereto, thereby producing octadecylamine-graphene (ODA-G). When the produced ODA-G is recovered using a solution such as tetrahydrofuran (THF), tetrachloromethane, or dichloroethane, pulverization occurs and individual graphene sheets are produced.

When recovering with hydrazine, 20 to 30% of the graphene may be lost. When performing pulverization with carbodiimide as a final step, graphene may be unstable and graphene sheets may be broken into graphene agglomerates. All of the three methods have a disadvantage that the quality of exfoliated graphene is not satisfactory.

Therefore, there is an urgent need for development of a method of improving the quality of graphene.

RELATED ART DOCUMENTS

Patent Documents

Korean Patent Application Publication No. 10-2016-0114372
Korean Patent Application Publication No. 10-2017-0126292

SUMMARY OF THE INVENTION

Therefore, the present disclosure has been made in view of the above problems, and it is an objective of the present disclosure to provide a method of simply manufacturing high-quality graphene in a short time, compared to existing methods of manufacturing graphene, and an apparatus therefor.

In accordance with an aspect of the present disclosure, the above and other objects can be accomplished by the provision of a method of manufacturing graphene, the method including a step of preparing a mixture by mixing expanded graphite and liquid nitrogen; and a step of applying ultrasonic waves to the mixture, wherein the ultrasonic energy applied to the mixture satisfies Equation 1 below:

$$5290X+35000<Y<-3360X+117310 \qquad \text{[Equation 1]}$$

wherein X represents the weight percentage of expanded graphite (%) expressed by the weight of expanded graphite (g)/[the weight of liquid nitrogen (g)+the weight of expanded graphite (g)]×100, and Y represents the total energy of ultrasonic waves applied to the mixture, and a unit thereof is J.

In accordance with another aspect of the present disclosure, there is provided an apparatus for manufacturing graphene, including a container for containing a mixture of expanded graphite and liquid nitrogen; and an ultrasonic probe for applying ultrasonic waves to the mixture, wherein ultrasonic energy applied to the mixture is controlled to satisfy Equation 1 below:

$$5290X+35000<Y<-3360X+117310 \qquad \text{[Equation 1]}$$

wherein X represents the weight percentage of expanded graphite (%) expressed by the weight of expanded graphite (g)/[the weight of liquid nitrogen (g)+the weight of expanded graphite (g)]×100, and Y represents the total energy of ultrasonic waves applied to a mixture, and a unit thereof is J.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 1 illustrates ultrasonic wave application energy with respect to the weight percentage of expanded graphite in an example and a comparative example.

DETAILED DESCRIPTION OF EXEMPLARY EMBODIMENTS

As the present disclosure allows for various changes and numerous embodiments, particular embodiments are illustrated in the drawings and described in detail in the written description.

However, this is not intended to limit the present disclosure to particular modes of practice, and it is to be appreciated that all changes, equivalents, and substitutes that do not depart from the spirit and technical scope of the present disclosure are encompassed in the present disclosure.

In the present disclosure, the terms such as "include" or "comprise" may be construed to denote a certain characteristic, number, step, operation, constituent element, or a combination thereof, but may not be construed to exclude the possibility of the presence or addition of one or more other characteristics, numbers, steps, operations, constituent elements, or combinations thereof.

In addition, it should be understood that the accompanying drawings in the present disclosure are shown to be enlarged or reduced for convenience of description.

Graphene Manufacturing Method

An embodiment of the present disclosure provides a method of manufacturing graphene, the method including a step of preparing a mixture by mixing expanded graphite and liquid nitrogen; and a step of applying ultrasonic waves to the mixture, wherein the ultrasonic energy applied to the mixture satisfies Equation 1 below:

$$5290X + 35000 < Y < -3360X + 117310 \quad \text{[Equation 1]}$$

wherein X represents the weight percentage of expanded graphite (%) expressed by the weight of expanded graphite (g)/[the weight of liquid nitrogen (g)+the weight of expanded graphite (g)]×100, and Y represents the total energy of ultrasonic waves applied to a mixture, and a unit thereof is J.

In Equation 1, X may be 0.5 to 9% by weight, particularly 1.0 to 8.0% by weight or 1.2 to 7.8% by weight. When X is within the ranges, graphene may be easily exfoliated from expanded graphite, and graphene having a sheet resistance (Rs) of 10 Ω/sq or less may be manufactured.

In addition, in Equation 1, Y may be 40,000 to 120,000 J, particularly 42,000 to 115,000 J, 43,000 to 115,000 J, or 44,000 to 110,000 J. When Y is within the ranges, multi-layered graphene having 25 layers or less, and there is an advantage that graphene having a sheet resistance of 10 Ω/sq or less may be manufactured.

In addition, the volume of the liquid nitrogen may satisfy Equation 2 below:

$$Vn/Vu \leq 5 \quad \text{[Equation 2]}$$

wherein Vn represents the volume of liquid nitrogen in the mixture, and

Vu represents the volume of an ultrasonic probe for applying ultrasonic energy.

In Equation 2, an upper limit of Vn/Vu may be 20 or less, particularly 19 or less, 18 or less, or 17.8 or less. A lower limit of Vn/Vu may be 0.5 or more, more particularly 1.0 or more, or 1.1 or more. When upper and lower limits of Vn/Vu are within the ranges, graphene having a low sheet resistance value may be manufactured.

In addition, expanded graphite may be manufactured through a step of chemically expanding graphite by mixing the graphite with a sulfur or nitrogen compound.

The sulfur or nitrogen compound is used as an intercalation material that penetrates between layers of graphite. Due to penetration of the sulfur or nitrogen compound between the graphite layers, a layer of the graphite may be exfoliated.

In addition, expanded graphite may be manufactured through a step of physically expanding the chemically expanded graphite by applying energy to the chemically expanded graphite.

The step of chemically expanding graphite may include a first stirring step of adding graphite to a mixed liquid of sulfuric acid and nitric acid and stirring the same such that the mixed liquid penetrates between layers of the graphite, thereby forming a mixture; and a second stirring step of adding an oxidizer to the mixture and mixing the same such that a surface of the graphite is oxidized.

In particular, the mixed liquid of sulfuric acid and nitric acid may be prepared by mixing sulfuric acid and nitric acid in a ratio of 1:1 to 5:1.

Here, the first stirring step is a step of adding graphite to the mixed liquid of sulfuric acid and nitric acid mixed in the above ratio and stirring the same for a predetermined time such that the mixed liquid penetrates between layers of graphite.

In addition, the second stirring step is a step of additionally adding an oxidizer to a mixture formed by the first stirring step to functionalize edges of graphite and, accordingly, to prevent recombination among graphite layers, and stirring the same such that more $SO_3^{2-}$ and $NO_3^-$ ions are intercalated between graphite layers.

The oxidizer is not specifically limited so long as it can oxidize the surface of graphite and, accordingly, prevent recombination among graphite layers. In particular, the oxidizer may be any one selected from the group consisting of potassium permanganate, potassium chlorate, perchloric acid, and hydrogen peroxide.

In addition, the step of chemically expanding graphite may further include a step of recovering graphite from the mixture formed through the second stirring step, and then adding a reaction solution consisting of any one of high-concentration hydrogen peroxide, acetone, sodium nitrate, potassium permanganate, potassium chlorate, thiobarbituric acid (TBA), and water to the recovered graphite to expand the graphite. The step of chemically expanding graphite is a step of adding a reactant to the mixture formed through the second stirring step and allowing this reaction to proceed.

In particular, in the step of chemically expanding graphite, only graphite is recovered from a mixed liquid of nitric acid and sulfuric acid through a separate filter, and then the reaction solution is added to the recovered graphite.

Here, the graphite recovered from the mixture includes nitric acid and sulfuric acid ions penetrated thereinto. In addition, a chemical reaction occurs due to addition of the reaction solution, thereby generating high-temperature heat.

At this time, inserts between layers of graphite are vaporized with the high-temperature heat for a short reaction time, and intervals between layers of the graphite are expanded. Accordingly, the graphite is expanded due to a chemical reaction between nitric acid and sulfuric acid intercalated between layers thereof.

The reaction solution may be any one of high-concentration hydrogen peroxide, acetone, sodium nitrate, potassium permanganate, potassium chlorate, thiobarbituric acid, and water, and consists of a material that is capable of reacting with and thus vaporizing nitric acid and sulfuric acid ions penetrated between layers of graphite.

In addition, the step of physically expanding the chemically expanded graphite may be performed by at least one process of a plasma process, a microwave process, and a rapid thermal annealing (RTA) process.

In particular, graphite is rapidly heated by performing at least one process of a plasma process, a microwave process, and a rapid thermal annealing (RTA) process, whereby non-expanded portions of the graphite may be rapidly expanded.

Due to the inclusion of the step of physically expanding the chemically expanded graphite, non-expanded regions of the chemically expanded graphite may be expanded and multilayered graphene may be exfoliated in an even shape.

In addition, the expanded graphite may be additionally subjected to a step of washing and drying.

In particular, a washing and drying step may be included to remove impurities contained in the expanded graphite.

Further, a step of separating liquid nitrogen from the manufactured graphene may be further included.

In particular, the manufactured graphene may be obtained by exfoliating graphite while dispersing in a solvent, or by performing stirring using ultrasonic waves, etc.

Graphene Manufacturing Apparatus

Another embodiment of the present disclosure provides an apparatus for manufacturing graphene, the apparatus including a container for containing a mixture of expanded graphite and liquid nitrogen; and an ultrasonic probe for applying ultrasonic waves to the mixture, wherein the ultrasonic energy applied to the mixture satisfies Equation 1 below:

$$5290X+35000<Y<-3360X+117310 \quad \text{[Equation 1]}$$

wherein X represents the weight percentage of expanded graphite (%) expressed by the weight of expanded graphite (g)/[the weight of liquid nitrogen (g)+the weight of expanded graphite (g)]×100, and Y represents the total energy of ultrasonic waves applied to a mixture, and a unit thereof is J.

In Equation 1, X may be 0.5 to 9% by weight, particularly 1.0 to 8.0% by weight or 1.2 to 7.8% by weight. When X is within the ranges, graphene may be easily exfoliated from expanded graphite, and graphene having a sheet resistance of 10 Ω/sq or less may be manufactured.

In addition, in Equation 1, Y may be 40,000 to 120,000 J, particularly 42,000 to 115,000 J, 43,000 to 115,000 J, or 44,000 to 110,000 J. When Y is within the ranges, multilayered graphene having 25 layers or less and there is an advantage that graphene having a sheet resistance of 10 Ω/sq or less may be manufactured.

In addition, the volume of the liquid nitrogen in the container may satisfy Equation 2 below:

$$Vn/Vu \leq 5 \quad \text{[Equation 2]}$$

wherein Vn represents the volume of liquid nitrogen in the mixture, and

Vu represents the volume of an ultrasonic probe for applying ultrasonic energy.

In Equation 2, an upper limit of Vn/Vu may be 20 or less, particularly 19 or less, 18 or less, or 17.8 or less. A lower limit of Vn/Vu may be 0.5 or more, 1.0 or more, or 1.1 or more. When upper and lower limits of Vn/Vu are within the ranges, graphene having a low sheet resistance value may be manufactured.

In addition, a material of the container is not specifically limited so long as it is a ceramic or metal material. In particular, the container may be made of glass or stainless. When the contained is made of stainless, the appearance and shape of the container may be unchanged upon application of ultrasonic waves.

In addition, the ultrasonic probe includes an ultrasonic actuator serving to transfer ultrasonic waves generated by an ultrasonic wave generator to the container.

Hereinafter, the present disclosure is described in detail with reference to examples and an experimental example.

However, the following examples and experimental example are only provided as embodiments of the present disclosure, and the scope of the present disclosure is not limited to the following examples and experimental example.

Synthesis Example 1. Preparation of Mixture of Liquid Nitrogen and Expanded Graphite (1) Expanded Graphite Preparation 10 to 20 parts by weight of sulfuric acid and 4 to 10 parts by weight of nitric acid were mixed based on 1 part by weight of graphite (manufacturer: Graphit Kropfmuhl, 32 mesh), and then graphite was recovered through a 5-micron metal mesh filter.

1 to 100 parts by weight of hydrogen peroxide was added to the recovered graphite to expand the graphite in a chemical method.

The expanded graphite was washed with purified water at pH 6 or more, and desired graphite was recovered through a 5-micron mesh filter. Next, the recovered graphite was pre-dried using a 100° C. hot-air dryer for 4 hours, and then secondarily expanded at 700° C. for 90 seconds through a rapid thermal annealing process.

(2) Preparation of Mixture of Liquid Nitrogen and Expanded Graphite 65 g of liquid nitrogen (manufacturer: Uniongas) and 1 g of expanded graphite were fed into and mixed in a container, thereby preparing a mixture (the weight percentage of expanded graphite: 1.5%).

Synthesis Example 2. Preparation of Mixture of Liquid Nitrogen and Expanded Graphite A mixture of liquid nitrogen and expanded graphite was prepared in the same manner as in Synthesis Example 1, except that 65 g of liquid nitrogen (manufacturer: Uniongas) and 2 g of expanded graphite were fed into and mixed in a container, thereby preparing a mixture (the weight percentage of expanded graphite: 3.0%).

Synthesis Example 3. Preparation of Mixture of Liquid Nitrogen and Expanded Graphite A mixture of liquid nitrogen and expanded graphite was prepared in the same manner as in Synthesis Example 1, except that 65 g of liquid nitrogen (manufacturer: Uniongas) and 3 g of expanded graphite were fed into and mixed in a container, thereby preparing a mixture (the weight percentage of expanded graphite: 4.4%).

Synthesis Example 4. Preparation of Mixture of Liquid Nitrogen and Expanded Graphite A mixture of liquid nitrogen and expanded graphite was prepared in the same manner as in Synthesis Example 1, except that 65 g of liquid nitrogen (manufacturer: Uniongas) and 3 g of expanded graphite were fed into and mixed in a container, thereby preparing a mixture (the weight percentage of expanded graphite: 7.2%).

Synthesis Example 5. Preparation of Mixture of Liquid Nitrogen and Expanded Graphite A mixture of liquid nitrogen and expanded graphite was prepared in the same manner as in Synthesis Example 1, except that 400 g of liquid nitrogen (manufacturer: Uniongas) and 10 g of expanded graphite were fed into and mixed in a container, thereby preparing a mixture (the weight percentage of expanded graphite: 2.4%).

Examples 1 to 5

Ultrasonic waves (trade name: VCX-750) were applied to a container containing a mixture (the weight percentage of expanded graphite: 1.5%) of liquid nitrogen and expanded graphite prepared according to Synthesis Example 1 under conditions summarized in Table 1 below, thereby manufacturing graphene. In the case of Examples 1 to 5 below, the total energy (J) of applied ultrasonic waves calculated by power×amplitude×time satisfied a range of about 43,059 to 112,191 J which is a range of the total energy of ultrasonic waves (Y) applied according to the weight percentage of expanded graphite (X) of Equation 1.

Here, a ratio of the volume (Vn) of liquid nitrogen to the volume (Vu) of an ultrasonic probe was about 4.5.

Next, liquid nitrogen was spontaneously vaporized at room temperature, and then a pure graphene powder was obtained. Next, 5 g of the graphene powder was dissolved in 95 g of toluene, thereby preparing a graphene dispersion.

TABLE 1

| | Power (watt) | Amplitude (%) | Time (min) | Energy (J) | Pulse (sec/sec) |
|---|---|---|---|---|---|
| Example 1 | 25 | 100 | 30 | 45,000 | 5/5 |
| Example 2 | 25 | 60 | 60 | 54,000 | 5/5 |
| Example 3 | 25 | 80 | 60 | 72,000 | 5/5 |
| Example 4 | 25 | 100 | 60 | 90,000 | 5/5 |
| Example 5 | 25 | 60 | 120 | 108,000 | 5/5 |

Examples 6 to 8

Graphene was manufactured in the same manner as in Examples 1 to 5, except that ultrasonic waves were applied to a container containing a mixture (the weight percentage of expanded graphite: 3.0%) of liquid nitrogen and expanded graphite prepared according to Synthesis Example 2 under conditions summarized in Table 2 below.

In the case of Examples 6 to 8 below, the total energy (J) of applied ultrasonic waves calculated by power×amplitude×time satisfied a range of about 50,876 to 107,226 J which is a range of the total energy of ultrasonic waves (Y) applied according to the weight percentage of expanded graphite (X) of Equation 1.

TABLE 2

| | Power (watt) | Amplitude (%) | Time (min) | Energy (J) | Pulse (sec/sec) |
|---|---|---|---|---|---|
| Example 6 | 25 | 60 | 60 | 54,000 | 5/5 |
| Example 7 | 25 | 80 | 60 | 72,000 | 5/5 |
| Example 8 | 25 | 100 | 60 | 90,000 | 5/5 |

Examples 9 and 10

Graphene was manufactured in the same manner as in Examples 1 to 5, except that ultrasonic waves were applied to a container containing a mixture (the weight percentage of expanded graphite: 4.4%) of liquid nitrogen and expanded graphite prepared according to Synthesis Example 3 under conditions summarized in Table 3 below.

In the case of Examples 9 to 10 below, the total energy (J) of applied ultrasonic waves calculated by power×amplitude×time satisfied a range of about 58,462 to 102,407 J which is a range of the total energy of ultrasonic waves (Y) applied according to the weight percentage of expanded graphite (X) of Equation 1.

TABLE 3

| | Power (watt) | Amplitude (%) | Time (min) | Energy (J) | Pulse (sec/sec) |
|---|---|---|---|---|---|
| Example 9 | 25 | 80 | 60 | 72,000 | 5/5 |
| Example 10 | 25 | 100 | 60 | 90,000 | 5/5 |

Example 11

Graphene was manufactured in the same manner as in Examples 1 to 5, except that ultrasonic waves were applied to a container containing a mixture (the weight percentage of expanded graphite: 7.2%) of liquid nitrogen and expanded graphite prepared according to Synthesis Example 4 under conditions summarized in Table 4 below.

In the case of Example 11 below, the total energy (J) of applied ultrasonic waves calculated by power×amplitude×time satisfied a range of about 72,981 to 93,158 J which is a range of the total energy of ultrasonic waves (Y) applied according to the weight percentage of expanded graphite (X) of Equation 1.

TABLE 4

| | Power (watt) | Amplitude (%) | Time (min) | Energy (J) | Pulse (sec/sec) |
|---|---|---|---|---|---|
| Example 11 | 25 | 100 | 60 | 90,000 | 5/5 |

Comparative Examples 1 and 2

Graphene was manufactured in the same manner as in Examples 1 to 5, except that ultrasonic waves were applied to a container containing a mixture (the weight percentage of expanded graphite: 1.5%) of liquid nitrogen and expanded graphite prepared according to Synthesis Example 1 under conditions summarized in Table 5 below.

TABLE 5

| | Power (watt) | Amplitude (%) | Time (min) | Energy (J) | Pulse (sec/sec) |
|---|---|---|---|---|---|
| Comparative Example 1 | 25 | 80 | 30 | 36,000 | 5/5 |
| Comparative Example 2 | 25 | 80 | 120 | 144,000 | 5/5 |

Comparative Examples 3 and 4

Graphene was manufactured in the same manner as in Examples 1 to 5, except that ultrasonic waves were applied to a container containing a mixture (the weight percentage of expanded graphite: 3.0%) of liquid nitrogen and expanded graphite prepared according to Synthesis Example 2 under conditions summarized in Table 6 below.

TABLE 6

|  | Power (watt) | Amplitude (%) | Time (min) | Energy (J) | Pulse (sec/sec) |
| --- | --- | --- | --- | --- | --- |
| Comparative Example 3 | 25 | 100 | 30 | 45,000 | 5/5 |
| Comparative Example 4 | 25 | 60 | 120 | 108,000 | 5/5 |

Comparative Examples 5 and 6

Graphene was manufactured in the same manner as in Examples 1 to 5, except that ultrasonic waves were applied to a container containing a mixture (the weight percentage of expanded graphite: 4.4%) of liquid nitrogen and expanded graphite prepared according to Synthesis Example 3 under conditions summarized in Table 7 below.

TABLE 7

|  | Power (watt) | Amplitude (%) | Time (min) | Energy (J) | Pulse (sec/sec) |
| --- | --- | --- | --- | --- | --- |
| Comparative Example 5 | 25 | 60 | 60 | 54,000 | 5/5 |
| Comparative Example 6 | 25 | 60 | 120 | 108,000 | 5/5 |

Comparative Examples 7 and 8

Graphene was manufactured in the same manner as in Examples 1 to 5, except that ultrasonic waves were applied to a container containing a mixture (the weight percentage of expanded graphite: 7.2%) of liquid nitrogen and expanded graphite prepared according to Synthesis Example 4 under conditions summarized in Table 8 below.

TABLE 8

|  | Power (watt) | Amplitude (%) | Time (min) | Energy (J) | Pulse (sec/sec) |
| --- | --- | --- | --- | --- | --- |
| Comparative Example 7 | 25 | 80 | 60 | 72,000 | 5/5 |
| Comparative Example 8 | 25 | 60 | 120 | 108,000 | 5/5 |

Comparative Examples 9 to 13

Graphene was manufactured in the same manner as in Examples 1 to 5, except that ultrasonic waves were applied to a container containing a mixture (the weight percentage of expanded graphite: 2.4%) of liquid nitrogen and expanded graphite prepared according to Synthesis Example 5 under conditions summarized in Table 9 below. Here, a ratio of the volume (Vn) of liquid nitrogen to the volume (Vu) of an ultrasonic probe was about 28.

TABLE 9

|  | Power (watt) | Amplitude (%) | Time (min) | Energy (J) | Pulse (sec/sec) |
| --- | --- | --- | --- | --- | --- |
| Comparative Example 9 | 25 | 100 | 30 | 45,000 | 5/5 |
| Comparative Example 10 | 25 | 60 | 60 | 54,000 | 5/5 |
| Comparative Example 11 | 25 | 80 | 60 | 72,000 | 5/5 |
| Comparative Example 12 | 25 | 100 | 60 | 90,000 | 5/5 |
| Comparative Example 13 | 25 | 60 | 120 | 108,000 | 5/5 |

Experimental Example 1

To investigate the number of layers of graphene manufactured according to each of the examples and the comparative examples, the graphene was subjected to scanning electron microscopy (SEM, Hitachi S-400) analysis. In addition, to investigate whether a surface of graphene was curled, the graphene was cut into a width×length of 10 cm×10 cm, and then a surface thereof was analyzed. Results are summarized in Tables 10 to 14.

In addition, the sheet resistance of graphene according to each of the examples and the comparative examples was measured by means of a 4-point probe instrument. The sheet resistance of each graphene sample was measured 10 times, and an average value thereof was used. Results are summarized in Tables 10 to 14.

TABLE 10

|  | The number of layers | Curl | Rs (Ω/sq) |
| --- | --- | --- | --- |
| Comparative Example 1 | 27 | X | 13.3 |
| Example 1 | 24 | X | 8.0 |
| Example 2 | 20 | X | 7.5 |
| Example 3 | 13 | X | 4.0 |
| Example 4 | 7 | X | 3.0 |
| Example 5 | 13 | X | 4.5 |
| Comparative Example 2 | 10 | ○ | 38 |

TABLE 11

|  | The number of layers | Curl | Rs (Ω/sq) |
| --- | --- | --- | --- |
| Comparative Example 3 | 27 | X | 11.0 |
| Example 6 | 24 | X | 9.4 |
| Example 7 | 17 | X | 5.2 |
| Example 8 | 11 | X | 3.7 |
| Comparative Example 4 | 16 | ○ | 48.0 |

TABLE 12

|  | The number of layers | Curl | Rs (Ω/sq) |
| --- | --- | --- | --- |
| Comparative Example 5 | 28 | X | 12.1 |
| Example 9 | 19 | X | 7.2 |
| Example 10 | 14 | X | 5.1 |
| Comparative | 20 | X | 51 |

TABLE 12-continued

|  | The number of layers | Curl | Rs (Ω/sq) |
|---|---|---|---|
| Example 6 |  |  |  |

TABLE 13

|  | The number of layers | Curl | Rs (Ω/sq) |
|---|---|---|---|
| Comparative Example 7 | 24 | X | 10.8 |
| Example 11 | 17 | X | 6.5 |
| Comparative Example 8 | 23 | X | 10.6 |

TABLE 14

|  | The number of layers | Curl | Rs (Ω/sq) |
|---|---|---|---|
| Comparative Example 9 | 37 | X | 26.5 |
| Comparative Example 10 | 34 | X | 23.8 |
| Comparative Example 11 | 27 | X | 14.5 |
| Comparative Example 12 | 21 | X | 11.5 |
| Comparative Example 13 | 25 | X | 13.1 |

Particularly, referring to Tables 10 and 11, when ultrasonic waves satisfying Equation 1 were applied based on the weight percentage of each expanded graphite, the expanded graphite was confirmed as having a multilayer structure of 25 layers or less and a sheet resistance value of up to 8.0 Ω/sq (the weight percentage of expanded graphite: 1.5%) and 9.4 Ω/sq (the weight percentage of expanded graphite: 3.0%).

However, when ultrasonic waves not satisfying Equation 1 were applied, it was confirmed that the exfoliation of graphene was inefficient or a surface of graphene was curled, whereby low-quality graphene was manufactured.

In addition, referring to Tables 12 and 13, when ultrasonic waves satisfying Equation 1 were applied based on the weight percentage of each expanded graphite, the expanded graphite was confirmed as having a multilayer structure of 25 layers or less and a sheet resistance value of up to 7.2 Ω/sq (the weight percentage of expanded graphite: 4.4%) and 6.5 Ω/sq (the weight percentage of expanded graphite: 7.2%)

However, when ultrasonic waves not satisfying Equation 1 were applied, it was confirmed that the exfoliation of graphene was inefficient or a sheet resistance value exceeded 10 Ω/sq. That is, since, in the case of the method of manufacturing graphene and the apparatus therefor according to the present disclosure, ultrasonic waves applied according to the weight percentage of expanded graphite satisfy Equation 1, it was confirmed that graphene having a multilayer structure of 25 layers or less was manufactured, a surface thereof was not curled, and a sheet resistance value thereof was reduced to 10 Ω/sq or less.

In addition, referring to Table 14, it was confirmed that, when a ratio of the volume (Vn) of liquid nitrogen to the volume (Vu) of an ultrasonic probe did not satisfy Equation 2, the exfoliation of graphene was inefficient or a sheet resistance value thereof exceeded 10 Ω/sq.

As described above, a method of manufacturing graphene and an apparatus therefor according to the present disclosure allow production of high-quality graphene in a simple manner in a short time without addition of a separate additive.

It will be apparent to those skilled in the art that various modifications can be made to the above-described exemplary embodiments of the present disclosure without departing from the spirit or scope of the disclosure. Thus, it is intended that the present disclosure covers all such modifications provided they come within the scope of the appended claims and their equivalents.

What is claimed is:

1. A method of manufacturing graphene, the method comprising:
   a step of preparing a mixture by mixing expanded graphite and liquid nitrogen; and
   a step of applying ultrasonic waves to the mixture,
   wherein the ultrasonic energy applied to the mixture satisfies Equation 1 below:

$$5290X + 35000 < Y < -3360X + 117310 \quad \text{[Equation 1]}$$

wherein X represents the weight percentage of expanded graphite (%) expressed by the weight of expanded graphite (g)/[the weight of liquid nitrogen (g)+the weight of expanded graphite (g)]×100, and
   Y represents the total energy of ultrasonic waves applied to a mixture, and a unit thereof is J.

2. The method according to claim 1, wherein X is 0.5 to 9% by weight.

3. The method according to claim 1, wherein Y is 40,000 to 120,000 J.

4. The method according to claim 1, wherein the volume of the liquid nitrogen satisfies Equation 2 below:

$$Vn/Vu \leq 5 \quad \text{[Equation 2]}$$

wherein Vn represents the volume of liquid nitrogen in the mixture, and
   Vu represents the volume of an ultrasonic probe for applying ultrasonic energy.

5. The method according to claim 1, wherein the expanded graphite is manufactured through a step of chemically expanding graphite by mixing graphite with a sulfur or nitrogen compound.

6. The method according to claim 5, wherein the expanded graphite is manufactured by additionally performing a step of physically expanding the chemically expanded graphite by applying energy to the chemically expanded graphite.

7. The method according to claim 5, wherein the step of chemically expanding the graphite comprises a first stirring step of adding graphite to a mixed liquid of sulfuric acid and nitric acid and stirring the same such that the mixed liquid penetrates between layers of the graphite, thereby forming a mixture; and
   a second stirring step of adding an oxidizer to the mixture and mixing the same such that a surface of the graphite is oxidized.

8. The method according to claim 6, wherein the step of physically expanding the chemically expanded graphite is performed by at least one of a plasma process, a microwave process, and a rapid thermal annealing (RTA) process.

9. The method according to claim 5, wherein the expanded graphite is additionally subjected to a washing and drying process.

10. The method according to claim 1, further comprising a step of separating liquid nitrogen from manufactured graphene.

11. An apparatus for manufacturing graphene, comprising:
- a container for containing a mixture of expanded graphite and liquid nitrogen; and
- an ultrasonic probe for applying ultrasonic waves to the mixture,
- wherein ultrasonic energy applied to the mixture is controlled to satisfy Equation 1 below:

$$5290X+35000<Y<-3360X+117310 \quad \text{[Equation 1]}$$

wherein X represents the weight percentage of expanded graphite (%) expressed by the weight of expanded graphite (g)/[the weight of liquid nitrogen (g)+the weight of expanded graphite (g)]×100, and Y represents the total energy of ultrasonic waves applied to a mixture, and a unit thereof is J.

12. The apparatus according to claim 11, wherein X is 0.5 to 9% by weight.

13. The apparatus according to claim 11, wherein Y is 40,000 to 120,000 J.

14. The apparatus according to claim 11, wherein the volume of the liquid nitrogen in a container satisfies Equation 2 below:

$$Vn/Vu \leq 5 \quad \text{[Equation 2]}$$

wherein Vn represents the volume of liquid nitrogen in a mixture, and

Vu represents the volume of an ultrasonic probe for applying ultrasonic energy.

* * * * *